(12) United States Patent
Isurin et al.

(10) Patent No.: US 8,184,458 B2
(45) Date of Patent: May 22, 2012

(54) POWER CONVERTER LOAD LINE CONTROL

(75) Inventors: Alexander Isurin, Dublin, OH (US); Alexander Cook, Dublin, OH (US)

(73) Assignee: Vanner, Inc., Hilliard, OH (US)

( * ) Notice: Subject to any disclaimer, the term of this patent is extended or adjusted under 35 U.S.C. 154(b) by 349 days.

(21) Appl. No.: 12/475,446

(22) Filed: May 29, 2009

(65) Prior Publication Data

US 2009/0296429 A1     Dec. 3, 2009

Related U.S. Application Data

(60) Provisional application No. 61/057,641, filed on May 30, 2008.

(51) Int. Cl.
*H02M 7/53*     (2006.01)
(52) U.S. Cl. ........................ 363/56.12; 363/40
(58) Field of Classification Search ............... 363/56.12, 363/16, 40, 97, 131, 101; 323/262
See application file for complete search history.

(56) References Cited

U.S. PATENT DOCUMENTS

| | | | | |
|---|---|---|---|---|
| 5,260,607 A | * | 11/1993 | Kinbara | 327/427 |
| 5,781,419 A | * | 7/1998 | Kutkut et al. | 363/17 |
| 5,875,103 A | * | 2/1999 | Bhagwat et al. | 363/17 |

* cited by examiner

*Primary Examiner* — Harry Behm
(74) *Attorney, Agent, or Firm* — James R. Eley; Michael A. Forhan; Eley Law Firm Co.

(57) ABSTRACT

A snubber circuit for a switching converter. A power source has a first rail and a second rail. A snubber transformer has a primary winding and a secondary winding, a first end of each of the primary and secondary windings being coupled together to form a transformer common point and a second end of the primary winding being connected to a half-bridge switching converter. A first capacitor is connected between the first rail and the transformer common point. A second capacitor is connected between the second rail and the transformer common point. A first diode is connected between the secondary winding and the first rail. A second diode is connected between the secondary winding and the second rail. The snubber circuit suppresses voltage transients and recovers energy from said voltage transients. In one embodiment the switching converter is a half-bridge configuration with zero current switching in a multi-level topology.

10 Claims, 12 Drawing Sheets

POWER CONVERTER LOAD LINE CONTROL

This application claims priority to U.S. provisional application 61/057,641, filed May 30, 2008, the contents of which are hereby incorporated by reference.

FIELD

The present invention relates generally to power supplies and power converters, in particular to active switching devices utilized in power supplies and power converters.

BACKGROUND

Conventional series-regulated linear power supplies are regulated by varying their resistance to cope with input voltage changes or load current demand changes. The linear regulator can, therefore, tend to be very inefficient. A switch-mode power supply, however, uses a high frequency switch (in practice a transistor) with varying duty cycle to maintain the output voltage. Output voltage variations caused by the switching action are typically filtered out using inductive and/or capacitive filter arrangements. Many modern power supplies and power converters utilize switch-mode topologies due to their typically high efficiency. Another advantage of switch-mode topologies is lower system weight in comparison to linear topologies, the reduction in weight being due to smaller magnetics associated with the high switching frequency of switch-mode systems.

In switch-mode technology, it is very important to ensure that the active devices (i.e., transistor power switches) remain within their safe operating area (SOA). This limitation can generally be addressed in several ways. One way is soft-switch technology with zero-current switching (ZCS) and zero voltage switching (ZVS). Another way is to implement snubber circuits, which control the "load line" of power devices. Yet another way is over-rating the device sufficiently to stay within its SOA.

"Snubber" circuits are often incorporated into switch-mode power converters to suppress voltage transients generated by the switching circuitry of the converter. However, available snubber circuits have significant disadvantages. The first disadvantage is power consumption, which may be as much as 2-3% of the nominal power of the converter. Further, they cannot work with a simple full leg power conversion stage (i.e., a half-bridge configuration). Adding more components, for example, soft-switch technology with auxiliary power switching, may resolve these problems. However, this approach has disadvantages in that it adds to the cost and complexity of the system. There is a need for a more efficient snubber for use with switch-mode power converters.

SUMMARY

A snubber circuit for full-leg power conversion with energy recovery is disclosed according to an embodiment of the present invention. The disclosed invention includes a relatively simple snubber using only passive components and which has energy recovery. Generally, about 70-80% of the energy used for the controlling the power switch load line is returned to the source. Some embodiments of the disclosed invention may also include a half-bridge converter with turn-on ZCS. Details of an exemplary ZCS configuration are discussed herein.

An object of the present invention is a snubber circuit for a switching converter. A power source has a first rail and a second rail. A snubber transformer has a primary winding and a secondary winding, a first end of each of the primary and secondary windings being coupled together to form a transformer common point and a second end of the primary winding being connected to a half-bridge switching converter. A first capacitor is connected between the first rail and the transformer common point. A second capacitor is connected between the second rail and the transformer common point. A first diode is connected between the secondary winding and the first rail. A second diode is connected between the secondary winding and the second rail. The snubber circuit suppresses voltage transients and recovers energy from said voltage transients.

Another object of the present invention is a half-bridge switching converter comprising a first voltage source and a second voltage source, a first terminal of each of the first and second voltage source being connected together to form a voltage source common point, a second terminal of the first voltage source forming a the first rail and a second terminal of the second voltage source forming a second rail. A first switch and a second switch are connected together to form a switch common point, a second terminal of the first switch being connected to the first rail and a second terminal of the second switch being connected to the second rail. A first diode is connected to the switch common point and the first rail. A second diode is connected to the switch common point and the second rail. A first inductor is connected to the switch common point and a second inductor is connected to the first inductor. A third auxiliary switch and a fourth auxiliary switch are connected together to form an auxiliary switch common point, a second terminal of the first auxiliary switch being connected to the fourth end of the second inductor and a second terminal of the fourth switch being connected to the voltage source common point. A third diode is connected to the auxiliary switch common point and the second inductor. A fourth diode is connected to the auxiliary switch common point and the voltage source common point.

BRIEF DESCRIPTION OF THE DRAWINGS

Further features of the inventive embodiments will become apparent to those skilled in the art to which the embodiments relate from reading the specification and claims with reference to the accompanying drawings, in which:

DETAILED DESCRIPTION

In the discussion that follows, like numerals are used to indicate like components and structures. Furthermore, in order to provide a succinct disclosure of the present invention it will be assumed that all semiconductors herein are ideal. Likewise, the disclosure that follows is limited to a buck converter, although any type of conventional converter is within the scope of the invention.

Figure 1:
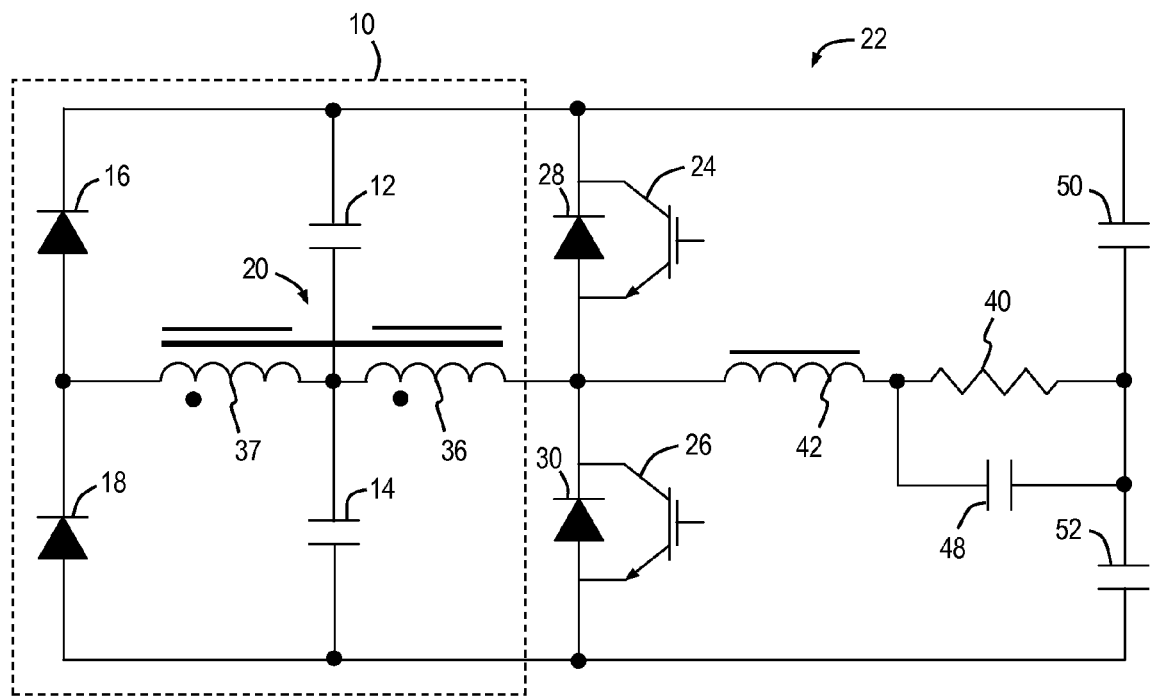
FIG. 1 is a schematic diagram showing the general arrangement of a snubber circuit according to an embodiment of the present invention.

The general arrangement of a snubber circuit 10 is shown in FIG. 1 according to an embodiment of the present invention. Snubber circuit 10 comprises first and second capacitors 12, 14, first and second diodes 16, 18 and a snubber transformer 20. Snubber circuit 10 is connected to a half-bridge DC-AC converter 22 comprising first and second switches 24, 26 respectively and third and fourth diodes 28, 30 respectively.

Figure 2:
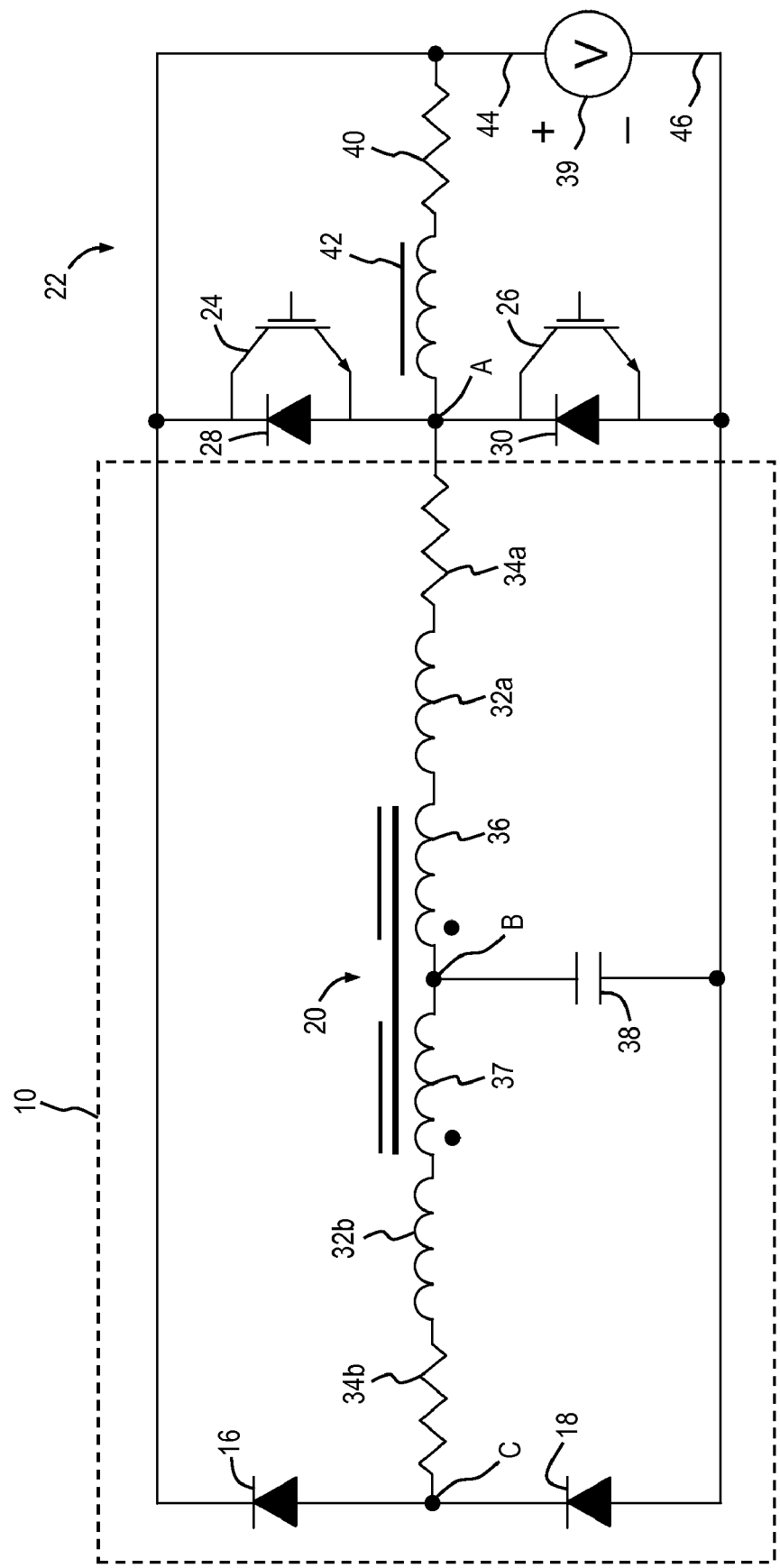
FIG. 2 is a schematic diagram of the snubber circuit of FIG. 1, including transformer parasitics.

FIG. 2 shows the snubber circuit 10 of FIG. 1 including snubber transformer 20 parasitics characteristics, specifically a leakage and magnetizing inductance 32a and a winding resistance 34a associated with a primary winding 36, as well as a leakage and magnetizing inductance 32b and a winding resistance 34b associated with a secondary winding 37. For purposes of analysis FIG. 2 to FIG. 8 shows capacitors 12, 14 as an equivalent capacitance 38. However, it should be noted that, in practice, two capacitors are preferred to provide more symmetrical behavior of snubber circuit 10 or, in other words, to compensate for other circuit parasitics. A power source 39 includes a first (positive) rail 44 and a second (negative) rail 46.

Figure 3:
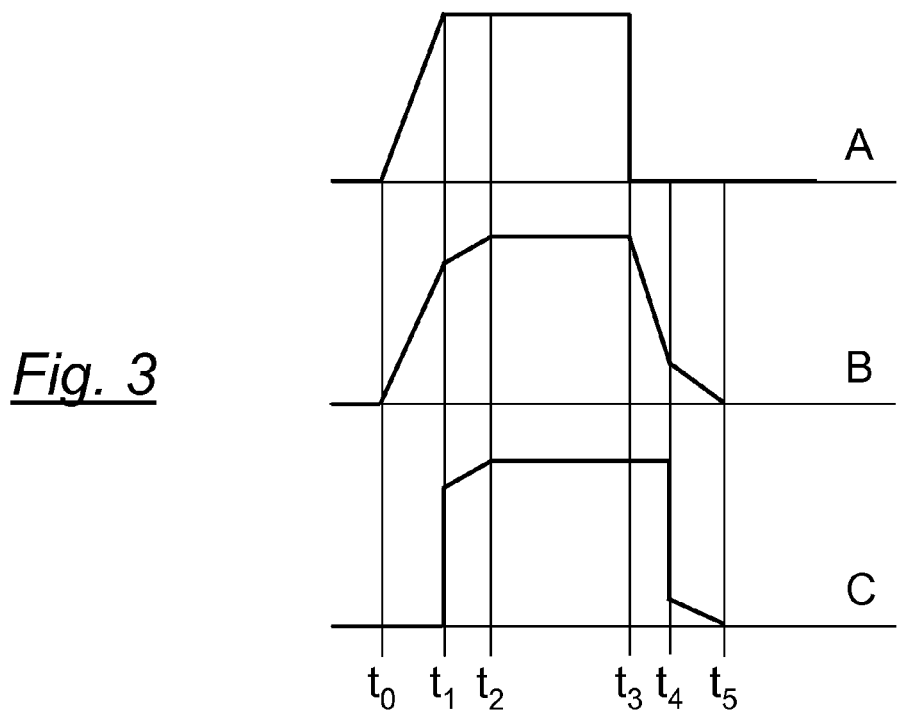
FIG. 3 shows waveforms generated by the snubber circuit of FIG. 1.

FIG. 3 shows theoretical waveforms of snubber circuit 10 when switch 26 is the active power switch. FIGS. 4-8 show equivalent circuits of various operational modes of the snubber circuit 10, with current flow paths being shown in bold lines. A detailed discussion of the operational modes follows.

Figure 4:
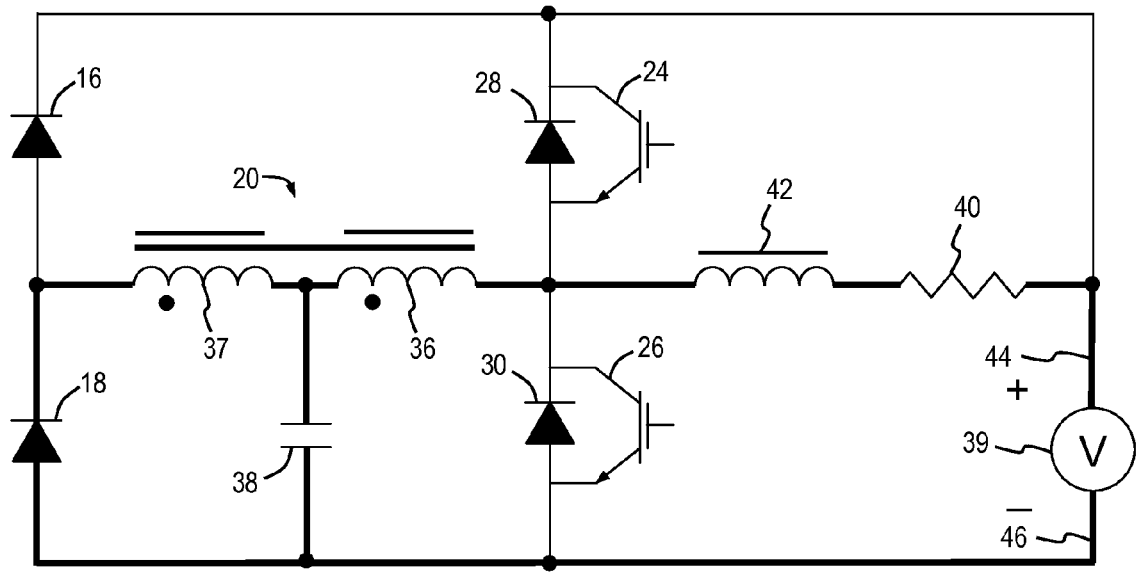
FIG. 4 is a schematic diagram showing current flow in the snubber circuit of FIG. 1 during a time period $t_0$-$t_1$.
Figure 5:
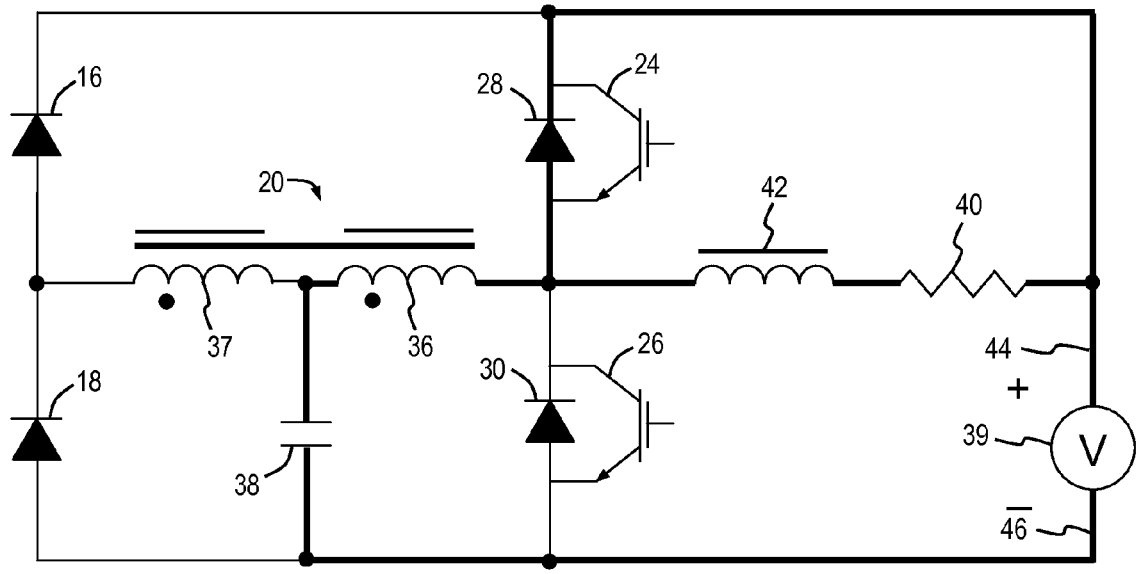
FIG. 5 is a schematic diagram with the heavy lines indicating current flow in the snubber circuit of FIG. 1 during a time period $t_1$-$t_2$.
Figure 6:
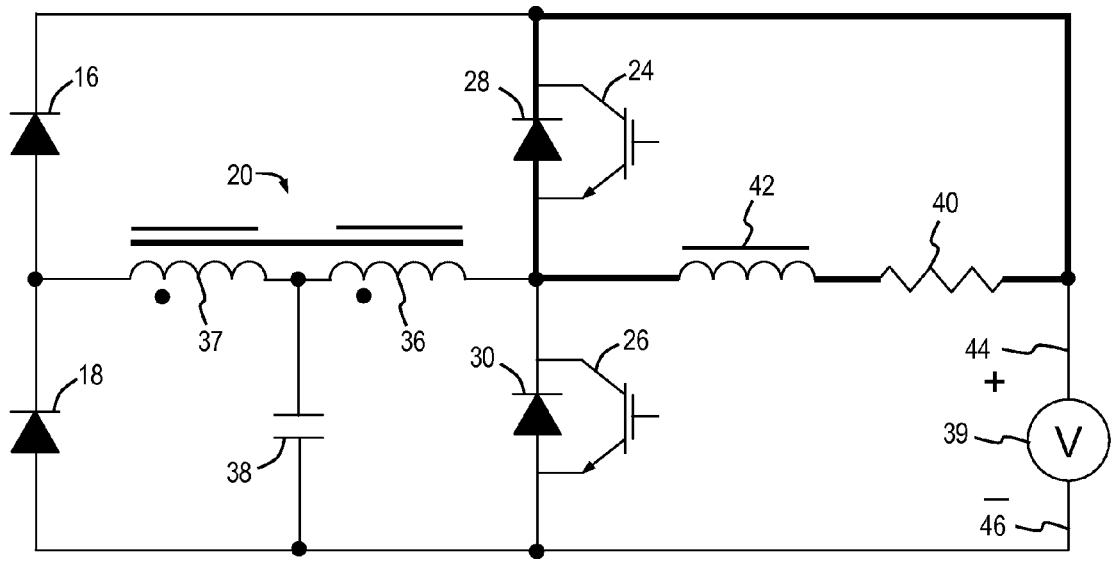
FIG. 6 is a schematic diagram with the heavy lines indicating current flow in the snubber circuit of FIG. 1 during a time period $t_2$-$t_3$.
Figure 7:
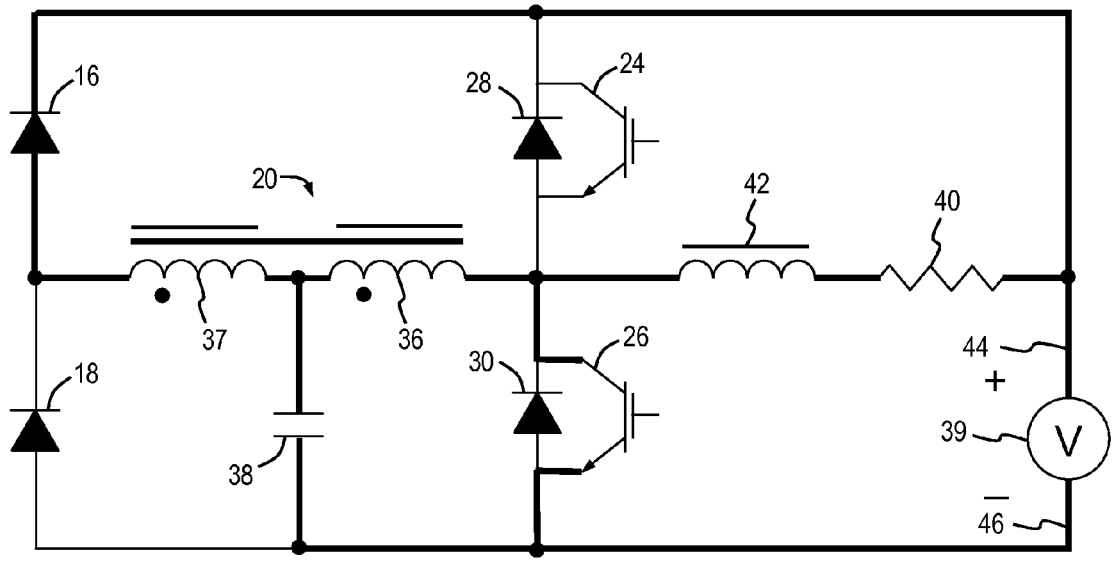
FIG. 7 is a schematic diagram with the heavy lines indicating current flow in the snubber circuit of FIG. 1 during a time period $t_3$-$t_4$.
Figure 8:
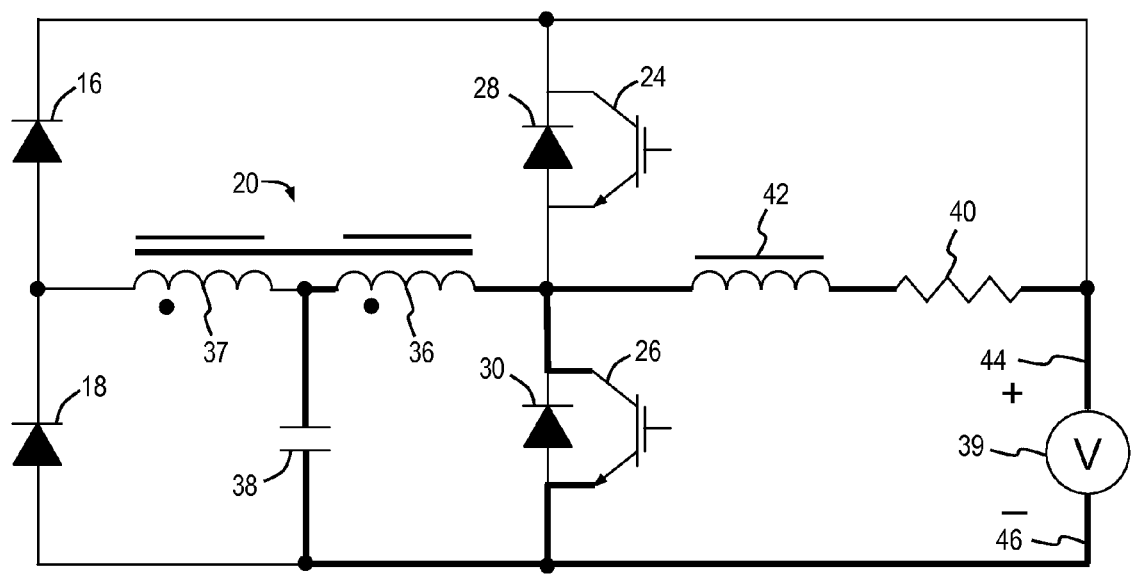
FIG. 8 is a schematic diagram with the heavy lines indicating current flow in the snubber circuit of FIG. 1 during a time period $t_4$-$t_5$.

With reference first to FIGS. 3 and 4 together, a time segment $t_0$-$t_1$ is shown. At time $t_0$ switch 26 is turned off and interrupts current flowing from a power source 39 to a load 40. Previous to time $t_0$ this interrupted current was flowing to load 40 via switch 26 and a filter inductor 42. At time $t_0$ a flyback process starts. The current from filter inductor 42 begins to charge equivalent capacitance 38 via primary winding 36 of snubber transformer 20. Between time $t_0$-$t_1$ secondary winding 37 of snubber transformer 20 is shunting primary winding 36 via diode 18, the secondary winding and equivalent capacitance 38. In this case equivalent capacitance 38 will be charged via the leakage inductances 32a, 32b (FIG. 2) of snubber transformer 20 and winding resistances 36a, 36b (FIG. 2), but the value of leakage inductances 32a, 32b is sufficiently small that it can be assumed for this analysis that the equivalent capacitance will charge linearly to time $t_1$. The equivalent capacitance 38 is charged by a current I expressed by Equation 1:

$$I = I_1(1+N) \qquad \text{Equation 1}$$

where $I_1$ is the current in the primary winding 36 of snubber transformer 20, which in this case flows from filter inductor 42, and N is the turns ratio of the transformer.

At time $t_1$ the voltage across switch 26 reaches a maximum value (i.e., a supply voltage V) and equivalent capacitance 38 stops the charging of the full current from filter inductor 42 because primary winding 36 of snubber transformer 20 stops the shunting by secondary winding 37. At time $t_1$ voltage across equivalent capacitance 38 and reaches a value $V_c$ expressed by Equation 2:

$$V_c = \frac{V}{1+N} \qquad \text{Equation 2}$$

where V is the supply voltage and N is the turns ratio of snubber transformer 20.

The duration of the time period $t_0$-$t_1$ is determined by the current from filter inductor 42, the value of equivalent capacitance 38 and the supply voltage V.

During time period $t_1$-$t_2$ (FIG. 5) the flyback process of the current from filter inductor 42 continues. During this time the equivalent capacitance 38 is charged by the magnetizing current of snubber transformer 20, which is small.

During time period $t_2$-$t_3$ (FIG. 6) the flyback current from filter inductor 42 continues but with the snubber circuit 10 there is little change. At time $t_3$ switch 26 turns on. A new cycle of power conversion begins and the process of the discharge of equivalent capacitance 38 begins, as well.

Most of the energy from equivalent capacitance 38 will discharge during time period $t_3$-$t_4$ (FIG. 7) and return to power source 39. This occurs because equivalent capacitance 38 is connected across primary winding 36 of snubber transformer 20 via switch 26, and the secondary winding 37 is connected to the power source 39 via diode 16. The value of the current via primary winding 36 will be determined by the impedance of the primary winding, diode 16 and equivalent capacitance 38. This discharging process will stop when equivalent capacitance 38 reaches a voltage value $V_c$ expressed by Equation 3:

$$V_c = \frac{V*N}{1+N} \qquad \text{Equation 3}$$

where V is the supply voltage and N is the turns ratio of snubber transformer 20. This process is analogous to the process during time period $t_0$-$t_1$ and will stop at time $t_4$. The time t between $t_3$-$t_4$ may be calculated using Equation 4:

$$t = \frac{V_c * C_{eq}}{I_1(1+N)} \qquad \text{Equation 4}$$

where $V_c$ is the voltage of equivalent capacitance 38, $C_{eq}$ is the capacitance of the equivalent capacitance, $I_1$ is the current in primary winding 36 and N is the turns ratio of snubber transformer 20.

At time $t_4$ (FIG. 8) equivalent capacitance 38 will begin to discharge via the magnetizing inductance 34a, 34b of primary winding 36 of snubber transformer 20 with a low level of current and will stop at time $t_5$. The process between time $t_4$-$t_5$ is analogous to the process between time $t_1$-$t_2$. When switch 24 provides power conversion the behavior of snubber circuit 10 will be identical to situations where switch 26 provides power conversion.

One skilled in the art will appreciate that the practical waveforms of snubber circuit 10 will differ from theoretical ones because practical semiconductors have body capacitance and a switching time greater than zero. In addition, all practical components have a real impedance, which will affect the appearance of the waveforms.

It should be noted that the half-bridge power converter configuration shown in the figures is for illustrative purposes only. The present invention is not limited to this topology and may be used to advantage with any configuration of power converter, including a single-switch converter wherein either one of switches 24 and 26 of the figures is omitted. Furthermore, the present invention may be incorporated into may be incorporated into other topologies including, without limitation, H-bridge and three-phase bridge topologies.

By diverting current from the power switch (such as switch 24 and/or 26 of FIG. 4) to the source (such as voltage source 39 of FIG. 4) during the switching event the losses in the switch are reduced. Furthermore, since the current diversion occurs through inductive components (such as transformer 20 of FIG. 4) and diodes (such as one or more of diodes 16, 18, 28 and 30 of FIG. 4) it is done more efficiently than with a more conventional circuit.

Figure 9:
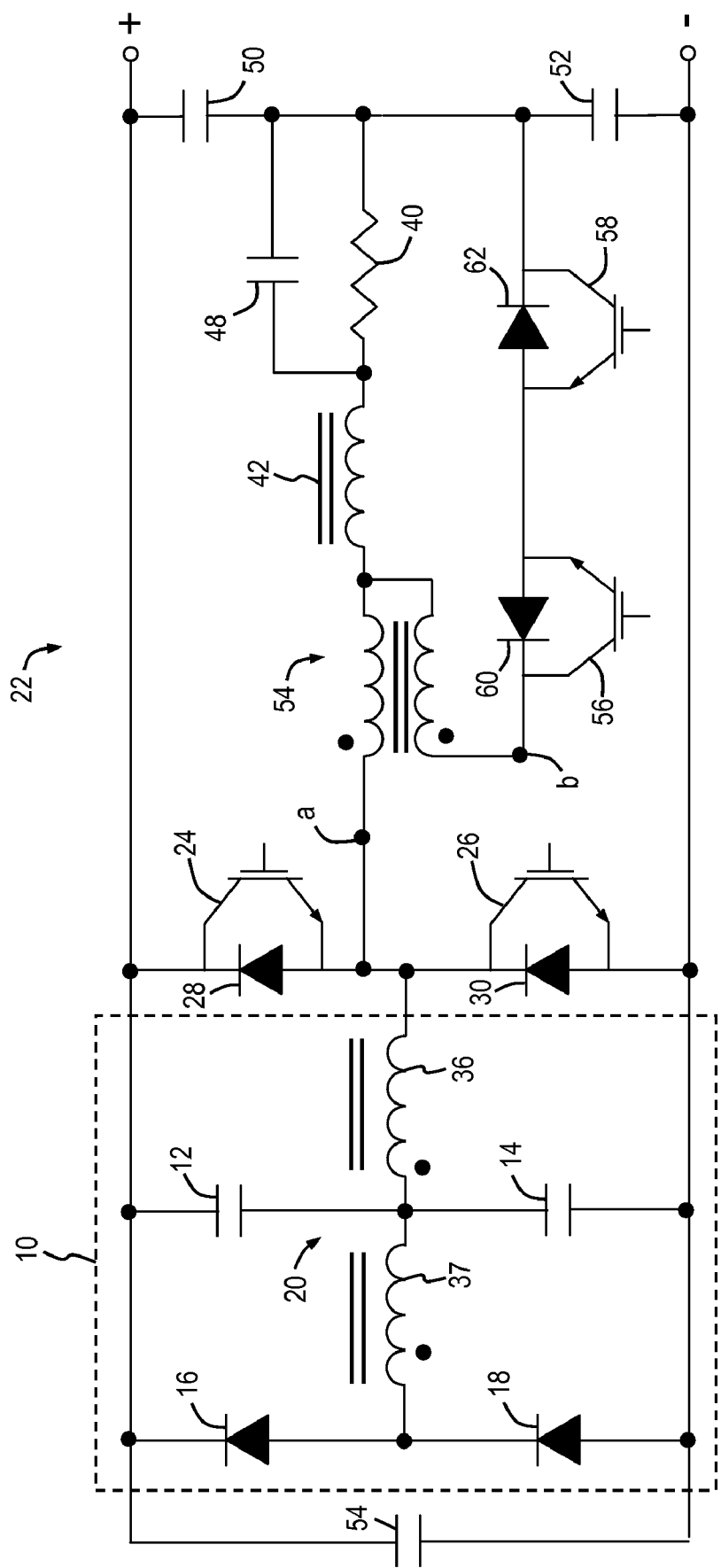
FIG. 9 is a schematic diagram of an example embodiment of the snubber circuit of FIG. 1.

An example embodiment of a snubber circuit 10 is shown in FIG. 9. The snubber circuit 10 is configured with a half-bridge DC-AC converter 22 providing 120 VAC output with 6 kW of nominal power and 12 kW of maximum power with zero current switching (ZCS) turn-on. Capacitors 48, 50, 52 and 54 shown in FIG. 9 are filter capacitors for converter 22, as are capacitors 48, 50 and 52 shown in FIG. 1. Additional converter 22 components include a transformer 54, third and fourth switches 56, 58, and fifth and sixth diodes 60, 62.

Snubber circuit 10 improves efficiency by around 1% and increases switching time when switches 24 and 26 turn off. Efficiency comparisons at 420 VDC input are shown in Table 1:

TABLE 1

| $P_{out}$ | Without Snubber | With Snubber |
|---|---|---|
| 6.2 kW | 96% | 96.8% |
| 10.6 kW | 95% | 96% |

Snubber circuit 10 is symmetrical in the suppression of voltage transients, provides ZVS turn off commutation and has about 75% energy recovery, returning the energy to the power converter. The controlled rise time will also reduce electromagnetic emissions and ZVS turn-off may allow a low voltage or safe operating area rated device to be used.

Figure 10:
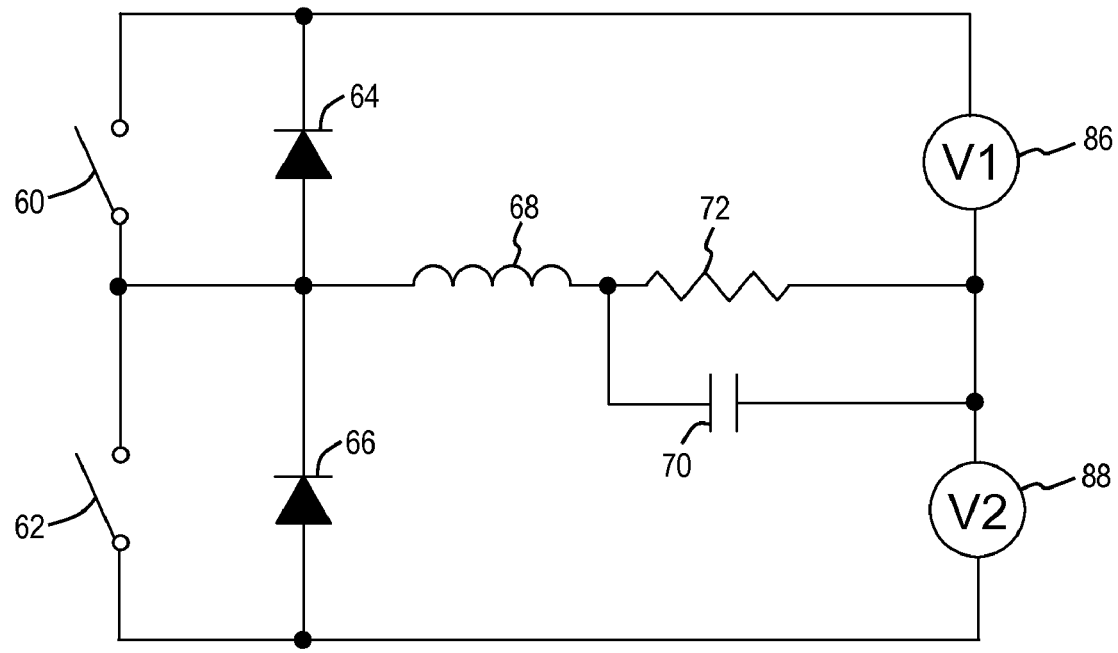
FIG. 10 is a schematic diagram of a single-level half-bridge DC-AC converter according to an embodiment of the present invention.
Figure 11:
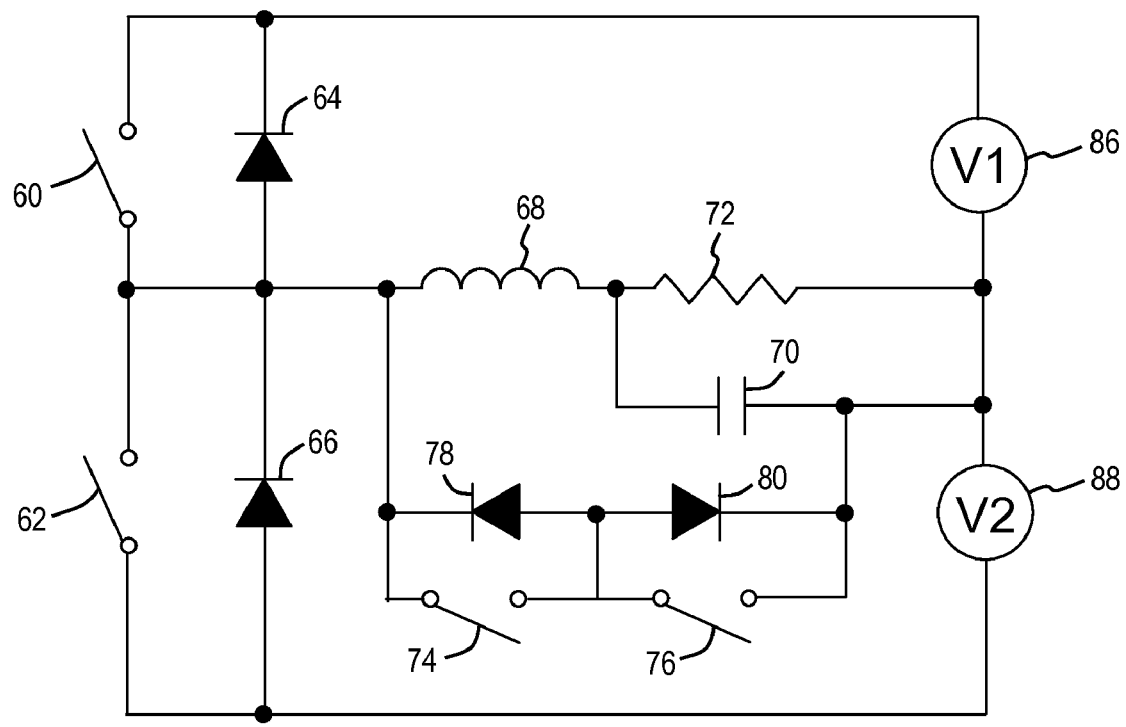
FIG. 11 is a schematic diagram of a three-level half-bridge DC-AC converter according to an embodiment of the present invention.
Figure 12:
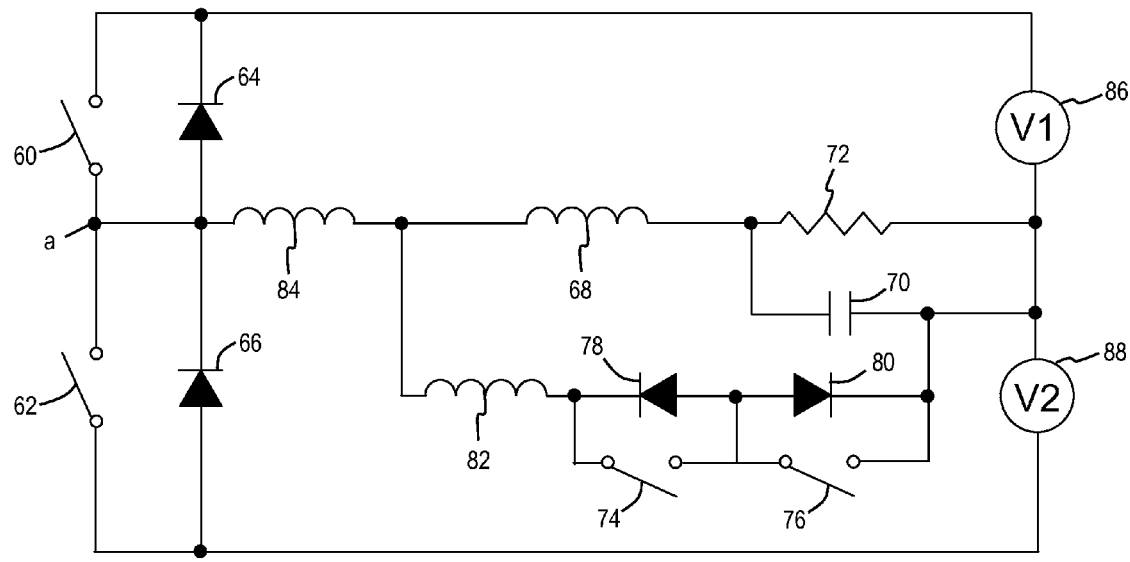
FIG. 12 is a schematic diagram of a three-level half-bridge DC-AC converter having a pair of auxiliary inductors according to another embodiment of the present invention.
Figure 14A:
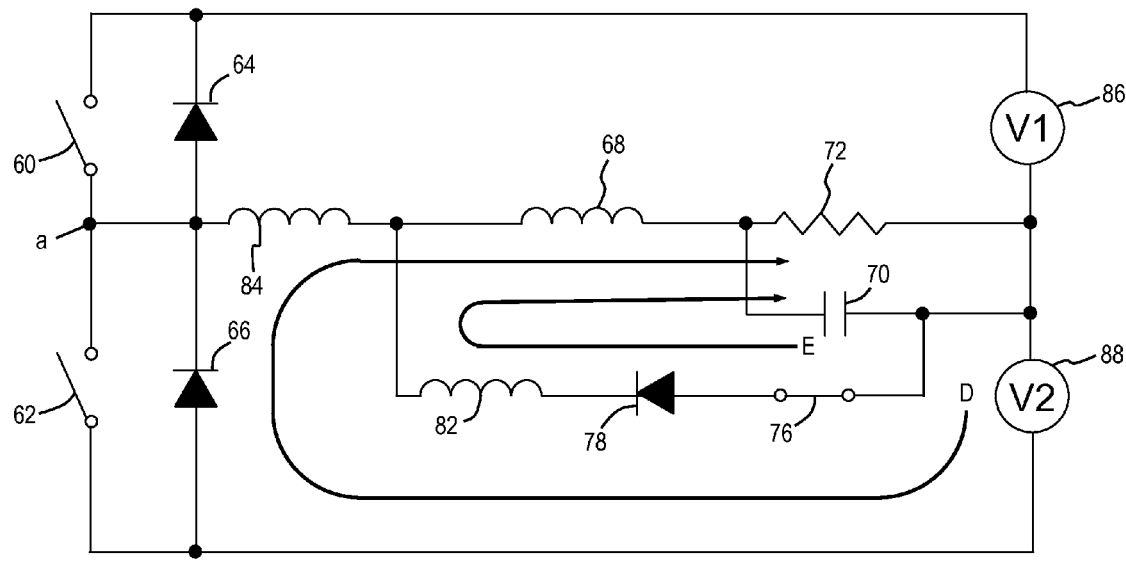
FIGS. 14a-14d show equivalent circuits of consecutive time segments corresponding to the waveforms of FIG. 13.

Most topologies of DC-AC converters with pulse width modulation (PWM) regulation have a common power conversion element, typically a half-bridge configuration. The half-bridge may be configured as a standalone circuit or may be incorporated into other topologies including, without limitation, H-bridge and three-phase bridge topologies. The half-bridge may be one level as shown in FIG. 10 or may be multi level such as the three level example shown in FIG. 11. The configuration of FIG. 10 comprises a pair of main power switches 60, 62, a pair of diodes 64, 66, a filter inductor 68, a filter capacitor 70 and a load 72. The primary difference between the topologies of FIGS. 10 and 11 is in the flyback process that circulates the flyback current either via main power switches 60, 62 or via a pair of auxiliary switches, 74, 76 in conjunction with a pair of auxiliary diodes 78, 80 respectively parallel thereto. The following discussion describes a means to provide soft-switch turn on (ZCS) commutation in a multi-level half-bridge topology for a DC-AC converter. An embodiment of the present invention is shown in FIG. 12. The primary difference between FIGS. 11 and 12 is that the circuit of FIG. 12 includes two auxiliary inductors, 82, 84. The value L of auxiliary inductors, 82, 84 is determined using the maximum current carried by these inductors and the desired current rise time in the switches expressed in Equation 5:

$$L = \frac{V * t}{2I}$$

Equation 5 where V is the value of a voltage source V1 (86) or V2 (88), t is the current rise or fall time and I is the value of the current when interrupted.

Figure 13:
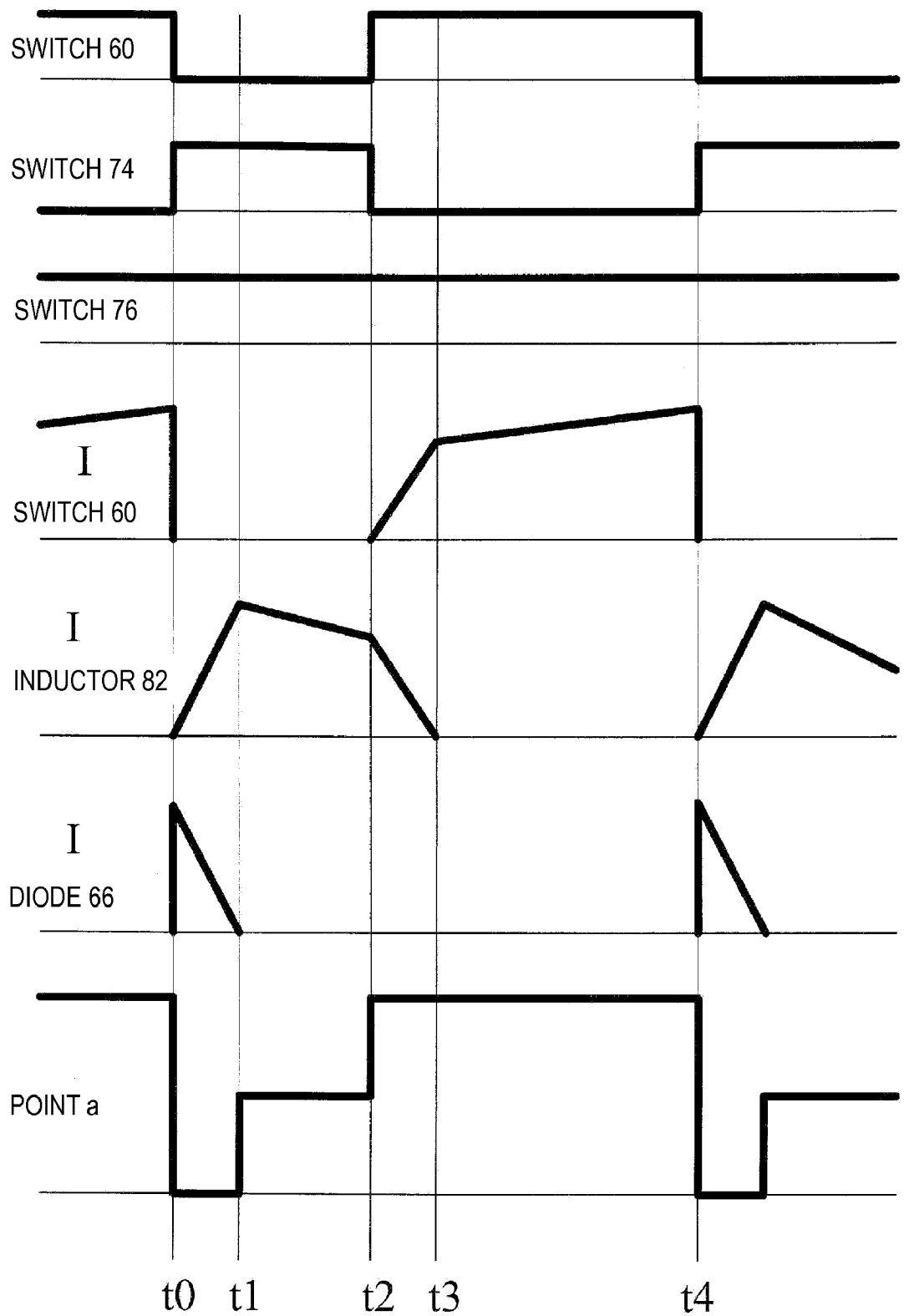
FIG. 13 is a graph showing theoretical current and voltage waveforms of the DC-AC converter of FIG. 12.

FIG. 13 shows theoretical current and voltage waveforms for the circuit of FIG. 12 when switch 60 is providing power conversion at rated power output with a lagging load current. FIGS. 14a-14d show equivalent circuits for the circuit of FIG. 12 and corresponding to the time periods described in FIG. 13. Starting with FIG. 14a, which is the time segment $t_0$-$t_1$, at time $t_0$ switch 60 is turned off, interrupting the current from the source to load 72. This current flows via switch 60, inductor 84, filter inductor 68, load 72, voltage source V1 (86) and voltage source V2 (88). At time $t_0$ the flyback process begins. The energy stored in inductor 84 and filter inductor 68 begins to discharge into load 72 via diode 66, as indicated by arrow D. The current via diode 66 will begin to linearly decrease. At the same time the current via inductor 82 will linearly rise from zero to the full value of current flowing in filter inductor 68. The load 72 current will now flow via inductor 82, diode 78 and switch 76, as depicted by arrow E.

Figure 14B:
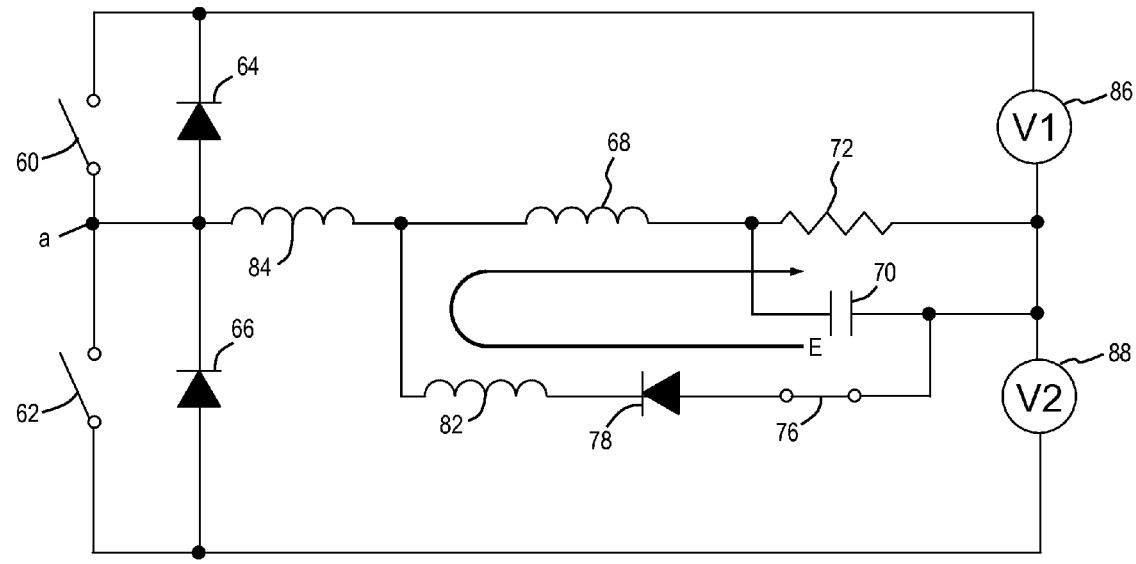
Figure 14C:
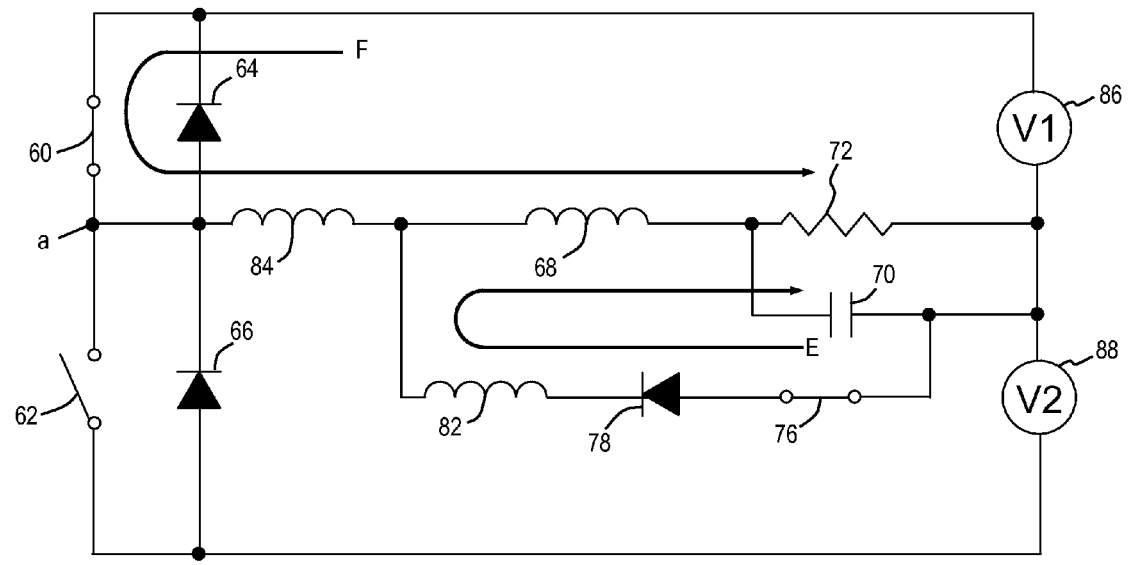

With reference to FIGS. 13 and 14b, during time period $t_1$-$t_2$ the current continues to flow via inductor 82, diode 78, switch 76, filter inductor 68 and load 72 as the current in filter inductor 68 continues to decay, as indicated by arrow E. At time $t_2$, switch 60 turns on and, since there is no current flowing in inductor 84 at this time, it does so with zero current. At this time the forward power conversion process begins again. Current from source V1 (86) begins to flow via switch 60 and inductor 84 and rise linearly, as indicated by arrow F (FIG. 14c). The current via inductor 82, diode 78 and switch 76, represented by arrow E, begins to reduce linearly. This process will continue until the current via switch 60 reaches the full load 72 current and the current via diode 78 and switch 76 reaches zero.

Figure 14D:
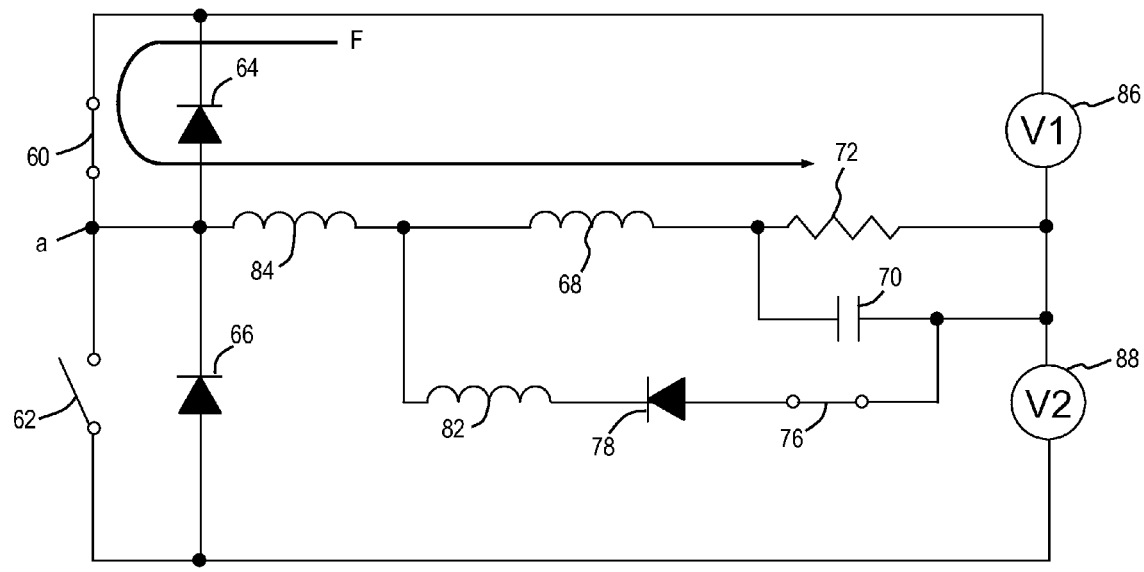

With reference to FIGS. 13 and 14d, between times $t_3$ and $t_4$ the converter executes a power conversion process. Energy from the source flows to load 72 through voltage source V1 (86), switch 60, inductor 84 and filter inductor 68, as indicated by arrow F (FIG. 14d).

As can be seen, the above-described circuit turns on under ZCS conditions. A second advantage of this configuration is that the dead time between switches 60 and 74, and also between switches 62 and 76, can be zero, simplifying the switching circuitry and increasing switching efficiency.

Figure 15:
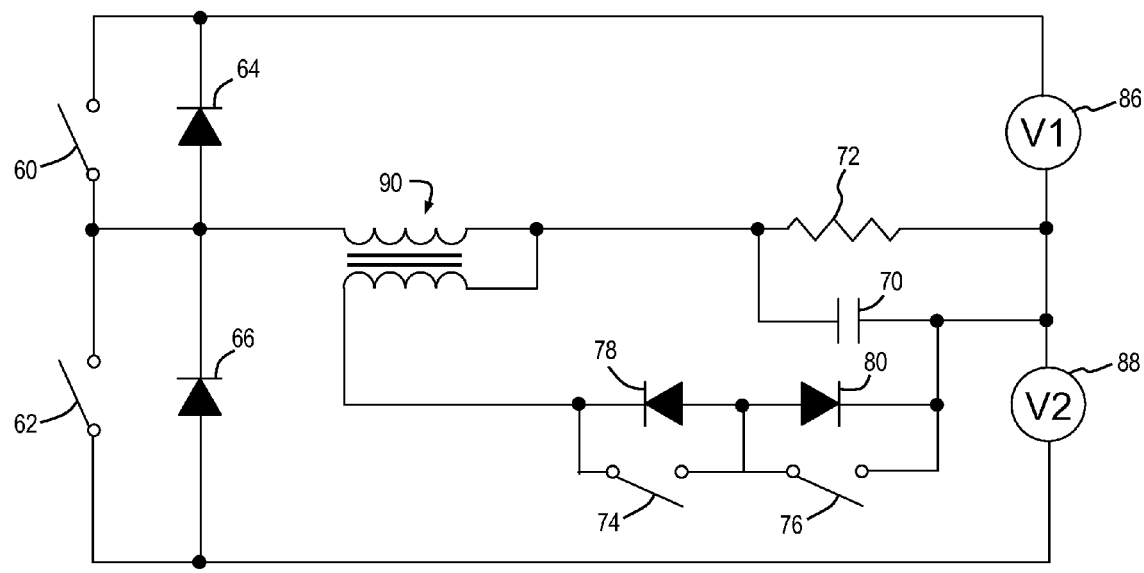
FIG. 15 is a schematic diagram of a three-level half-bridge DC-AC converter having an integrated inductor according to yet another embodiment of the present invention.

To make the configuration of FIGS. 14a-14d easier to implement the inductors 82, 84 may be integrated into either one or two components. A first example implementation is shown in FIG. 15, where auxiliary inductors 82, 84 and filter inductor 68 are all integrated into a single inductor 90. In this configuration the function of auxiliary inductors 82, 84 will be performed by the leakage inductances of inductor 90. In one embodiment inductor 90 has two windings with equal turns.

Figure 16:
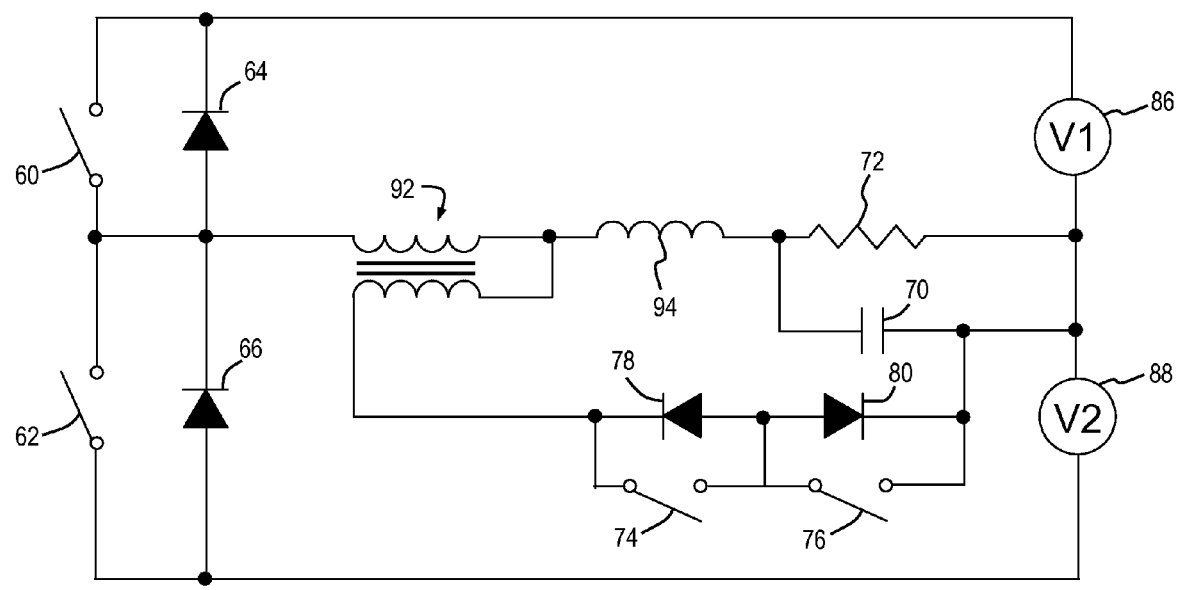
FIG. 16 is a schematic diagram of a three-level half-bridge DC-AC converter having a pair of inductors according to still another embodiment of the present invention.

With reference to FIG. 16, in another example embodiment of the present invention inductor 90 may be split into two inductors 92, 94. In one embodiment inductor 92 has two windings with equal turns.

While this invention has been shown and described with respect to a detailed embodiment thereof, it will be understood by those skilled in the art that changes in form and detail thereof may be made without departing from the scope of the claims of the invention.

What is claimed is:

1. A snubber circuit for improving the efficiency of a switching converter, comprising:
   a power source having a first rail and a second rail;
   a first diode having a first anode and a first cathode, the first cathode being connected to the first rail;
   a second diode having a second anode and a second cathode, the second cathode being connected to the first anode to form a switch common point and the second anode being connected to the second rail;
   a switch connected in parallel with one of the first and second diodes to form a power converter;
   a snubber transformer having a primary winding and a secondary winding, a first end of each of the primary and secondary windings being coupled together to form a transformer common point and a second end of the primary winding being connected to the switch common point;
   a first capacitor connected between the first rail and the transformer common point;
   a second capacitor connected between the second rail and the transformer common point;
   a third diode having a third anode and a third cathode, the third anode being connected to a second end of the secondary winding and the third cathode being connected to the first rail;
   a fourth diode having a fourth anode and a fourth cathode, the fourth cathode being connected to the second end of the secondary winding and the fourth anode being connected to the second rail;
   a filter inductor having a first inductor terminal and a second inductor terminal, the first inductor terminal being connected to the switch common point; and
   a load connected between the second inductor terminal and the power source,
   the snubber circuit being effective to suppress voltage transients in the converter circuitry and recover energy from said voltage transients, thereby improving the efficiency of the converter.

2. The snubber circuit of claim 1, further comprising a filter capacitor connected in parallel with the load.

3. The snubber circuit of claim 1, further comprising:
   a third capacitor connected between the first rail and the second load terminal; and
   a fourth capacitor connected between the second load terminal and the second rail.

4. A snubber circuit for improving the efficiency of a switching converter, comprising:
   a power source having a first rail and a second rail;
   a half-bridge power converter comprising a first switch and a second switch, a first terminal of each of the first and second switches being connected together to form a switch common point, a second terminal of the first switch being connected to the first rail and a second terminal of the second switch being connected to the second rail;
   a snubber transformer having a primary winding and a secondary winding, a first end of each of the primary and secondary windings being coupled together to form a transformer common point and a second end of the primary winding being connected to the switch common point;
   a first capacitor connected between the first rail and the transformer common point;
   a second capacitor connected between the second rail and the transformer common point;
   a first diode having a first anode and a first cathode, the first anode being connected to a second end of the secondary winding and the first cathode being connected to the first rail;
   a second diode having a second anode and a second cathode, the second cathode being connected to the second end of the secondary winding and the second anode being connected to the second rail;
   a third diode having a third anode and a third cathode, the third cathode being connected to the first rail and the third anode being connected to the switch common point;
   a fourth diode having a fourth anode and a fourth cathode, the fourth cathode being connected to the switch common point and the fourth anode being connected to the second rail;
   a filter inductor having a first inductor terminal and a second inductor terminal, the first inductor terminal being connected to the switch common point; and
   a load connected between the second inductor terminal and the power source,
   the snubber circuit being effective to suppress voltage transients in the converter circuitry and recover energy from said voltage transients, thereby improving the efficiency of the converter.

5. The snubber circuit of claim 4, further comprising a filter capacitor connected in parallel with the load.

6. The snubber circuit of claim 4, further comprising:
   a third capacitor connected between the first rail and the second load terminal; and
   a fourth capacitor connected between the second load terminal and the second rail.

7. A half-bridge switching converter, comprising:
   a first voltage source and a second voltage source, a first terminal of each of the first and second voltage source being connected together to form a voltage source common point, a second terminal of the first voltage source forming a the first rail and a second terminal of the second voltage source forming a second rail;
   a first switch and a second switch, a first terminal of each of the first and second switches being connected together to form a switch common point, a second terminal of the first switch being connected to the first rail and a second terminal of the second switch being connected to the second rail;
   a first diode having a first anode and a first cathode, the first anode being connected to the switch common point and the first cathode being connected to the first rail;

a second diode having a second anode and a second cathode, the second cathode being connected to the switch common point and the second anode being connected to the second rail;

a first inductor having a first and a second end, the first end being connected to the switch common point;

a second inductor having a third end and a fourth end, the third end being connected to the second end of the first inductor;

a third, auxiliary switch and a fourth, auxiliary switch, a first terminal of each of the third and fourth switches being connected together to form an auxiliary switch common point, a second terminal of the first auxiliary switch being connected to the fourth end of the second inductor and a second terminal of the fourth switch being connected to the voltage source common point;

a third diode having a third anode and a third cathode, the third anode being connected to the auxiliary switch common point and the third cathode being connected to the fourth end of the second inductor; and a fourth diode having a fourth anode and a fourth cathode, the fourth anode being connected to the auxiliary switch common point and the fourth cathode being connected to the voltage source common point.

8. The switching converter of claim 7, further comprising a filter inductor having a fifth end and a sixth end, the fifth end being connected to the second end of the first inductor.

9. The switching converter of claim 8, further comprising a load connected between the sixth end of the filter inductor and the voltage source common point.

10. The switching converter of claim 9, further comprising a filter capacitor connected in parallel with the load.

* * * * *